US011200444B2

(12) United States Patent
Ou et al.

(10) Patent No.: US 11,200,444 B2
(45) Date of Patent: Dec. 14, 2021

(54) PRESENTATION OBJECT DETERMINING METHOD AND APPARATUS BASED ON IMAGE CONTENT, MEDIUM, AND DEVICE

(71) Applicant: TENCENT TECHNOLOGY (SHENZHEN) COMPANY LIMITED, Shenzhen (CN)

(72) Inventors: Yanlin Ou, Shenzhen (CN); Qinglin Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 101 days.

(21) Appl. No.: 16/537,885

(22) Filed: Aug. 12, 2019

(65) Prior Publication Data
US 2019/0385012 A1 Dec. 19, 2019

Related U.S. Application Data

(63) Continuation of application No. PCT/CN2018/100009, filed on Aug. 10, 2018.

(30) Foreign Application Priority Data

Aug. 11, 2017 (CN) .......................... 201710685418.4

(51) Int. Cl.
G06K 9/62 (2006.01)
G06F 16/901 (2019.01)
G06K 9/46 (2006.01)

(52) U.S. Cl.
CPC ....... *G06K 9/6215* (2013.01); *G06F 16/9027* (2019.01); *G06K 9/46* (2013.01);
(Continued)

(58) Field of Classification Search
CPC ...... G06K 9/6215; G06K 9/46; G06K 9/6218; G06K 9/6276; G06K 9/628; G06K 9/6272;
(Continued)

(56) References Cited

U.S. PATENT DOCUMENTS

2011/0085739 A1   4/2011  Zhang et al.
2013/0011030 A1*  1/2013  Tzoumas ............... G06T 7/74
                                                    382/128
(Continued)

FOREIGN PATENT DOCUMENTS

CN    102057371 A    5/2011
CN    102402508 A    4/2012
(Continued)

OTHER PUBLICATIONS

International Search Report dated Nov. 1, 2018 in Application PCT/CN2018/100009, citing references AA and AO-AT therein, 8 pages, with English Machine Translation.
(Continued)

*Primary Examiner* — Amandeep Saini
(74) *Attorney, Agent, or Firm* — Oblon, McClelland, Maier & Neustadt, L.L.P.

(57) ABSTRACT

Aspects of the disclosure provide methods and apparatuses for determining a presentation object. In some examples, an apparatus for determining a presentation object includes processing circuitry. The processing circuitry extracts a feature of an object in an image and determines, according to the feature of the object, first feature similarities between the object and a plurality of class nodes. Each class node is associated with at least one leaf node, and each of the class nodes and the leaf nodes is associated with one presentation object. The processing circuitry selects a subset of the plurality of class nodes according to the first feature simi-
(Continued)

larities and calculates second feature similarities between the leaf nodes associated with the selected subset of the plurality of class nodes and the object. The processing circuitry selects a predetermined quantity of presentation objects according to the first feature similarities and the second feature similarities.

20 Claims, 5 Drawing Sheets

(52) U.S. Cl.
CPC ............ *G06K 9/628* (2013.01); *G06K 9/6218* (2013.01); *G06K 9/6276* (2013.01)

(58) Field of Classification Search
CPC . G06K 9/6282; G06F 16/9027; G06F 16/483; G06F 16/51; G06Q 30/0631; G06Q 30/0643
USPC .......................................................... 385/159
See application file for complete search history.

(56) References Cited

U.S. PATENT DOCUMENTS

| | | | |
|---|---|---|---|
| 2014/0133745 A1 | 5/2014 | Razavi et al. | |
| 2016/0267359 A1 | 9/2016 | Gan et al. | |
| 2018/0210896 A1 | 7/2018 | Guo | |
| 2018/0308124 A1* | 10/2018 | Gao | ........................ G06N 20/20 |

FOREIGN PATENT DOCUMENTS

| | | |
|---|---|---|
| CN | 103324949 A | 9/2013 |
| CN | 103559504 A | 2/2014 |
| CN | 103620645 A | 3/2014 |
| CN | 106354735 A | 1/2017 |
| CN | 108288208 A | 7/2018 |

OTHER PUBLICATIONS

Written Opinion dated Nov. 1, 2018 in Application PCT/CN2018/100009, 4 pages.

* cited by examiner

PRESENTATION OBJECT DETERMINING METHOD AND APPARATUS BASED ON IMAGE CONTENT, MEDIUM, AND DEVICE

RELATED APPLICATION

This application is a continuation of International Application No. PCT/CN2018/100009, filed on Aug. 10, 2018, which claims priority to Chinese Patent Application No. 201710685418.4, filed on Aug. 11, 2017 and entitled "PRESENTATION OBJECT DETERMINING METHOD AND APPARATUS BASED ON IMAGE CONTENT, MEDIUM, AND DEVICE". The entire disclosures of the prior applications are hereby incorporated by reference in their entirety.

FIELD OF THE TECHNOLOGY

This application relates to the field of information retrieval technologies, and in particular, to a presentation object determining method and apparatus based on image content, a medium, and a device.

BACKGROUND OF THE DISCLOSURE

Digital images have become a major means through which networks and intelligent devices transmit information to users. For example, during shopping, an object is presented in a form of an image, so that a user learns about the appearance of the object. When a user watches a video, each frame in the video also includes various objects, and the user may be interested in some of the objects. To help the user learn about an object in a picture and similar objects, a feature of the object in the picture is usually extracted, and then presentation objects similar to the object are searched for in a presentation object set according to the extracted feature and are recommended to the user.

Usually, during a search for presentation objects, a similarity between the object in the image and each presentation object in the presentation object set needs to be calculated according to the feature of the object, and then presentation objects whose similarities rank in the first N (where N is a positive integer greater than 0) positions are selected and recommended to the user.

It can be seen that, the whole presentation object set is traversed each time presentation objects are searched for. When there is a large quantity of presentation objects in the presentation object set, each time similar objects of one object are retrieved, the whole presentation object set is traversed, which causes a tremendous computing amount, is time-consuming, and wastes processing resources.

SUMMARY

Aspects of the disclosure provide methods and apparatuses for determining a presentation object. In some examples, an apparatus for determining a presentation object includes processing circuitry.

The processing circuitry extracts a feature of an object in an image. The processing circuitry determines, according to the feature of the object, a plurality of first feature similarities between the object and a plurality of class nodes in a pre-constructed search tree. Each of the plurality of class nodes is associated with at least one leaf node, and each of the plurality of class nodes and the at least one leaf node associated with the respective class node is associated with one of a plurality of presentation objects. The processing circuitry selects a subset of the plurality of class nodes according to the plurality of first feature similarities. The processing circuitry calculates a plurality of second feature similarities between the plurality of leaf nodes associated with the selected subset of the plurality of class nodes and the object. The processing circuitry selects, from the plurality of presentation objects, a predetermined quantity of presentation objects according to the plurality of first feature similarities and the plurality of second feature similarities.

In some embodiments, the pre-constructed search tree represents a presentation object set including the plurality of presentation objects, and each of the plurality of class nodes represents a class of presentation objects.

In some embodiments, the processing circuitry classifies the plurality of presentation objects in the presentation object set based on a cluster analysis method. The processing circuitry determines, for each class of presentation objects, a presentation object that is in the respective class of presentation objects and that has a shortest distance to a cluster center of the plurality of class nodes as a class node for representing the respective class of presentation objects. The processing circuitry determines, for each class of presentation objects, each presentation object in the respective class of presentation objects except for the presentation object associated with the class node of the respective class of presentation objects as one of the at least one leaf node associated with the class node of the respective class of presentation objects.

In some embodiments, a number of the plurality of calculated second feature similarities is limited to a target quantity.

In some embodiments, all of the second feature similarities between the plurality of leaf nodes associated with one of the subset of the plurality of class nodes and the object are calculated before the plurality of second feature similarities between the plurality of leaf nodes associated with another one of the subset of the plurality of class nodes and the object is calculated.

In some embodiments, a calculation order of the plurality of second feature similarities is based on a plurality of third feature similarities between one of the subset of the plurality of class nodes and the plurality of leaf nodes associated with the one of the subset of the plurality of class nodes.

In some embodiments, the processing circuitry calculates the cluster center of the plurality of class nodes according to features of the plurality of class nodes. The processing circuity selects, from the plurality of class nodes, a class node with a shortest distance to the cluster center of the plurality of class nodes as a root node in the pre-constructed search tree. The processing circuity associates other class nodes of the plurality of class nodes except the root node with the root node. The processing circuity calculates a fourth feature similarity between the object and the root node.

Aspects of the disclosure also provide a non-transitory computer-readable medium storing instructions which when executed by at least one processor cause the at least one processor to perform any of the methods for determining a presentation object.

DESCRIPTION OF EMBODIMENTS

For ease of understanding of the technical solutions provided in the embodiments of this application, the following further describes the embodiments of this application in detail with reference to the accompanying drawings of the specification.

Figure 1:
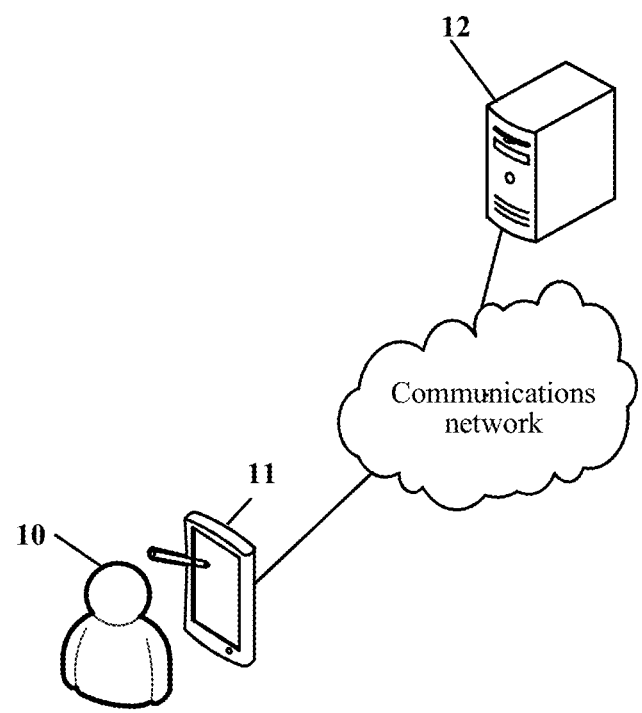
FIG. 1 is a schematic diagram of an application scenario of a presentation object determining method based on image content according to an embodiment of this application.

First, refer to FIG. 1, which is one schematic diagram of an application scenario of a presentation object determining method based on image content according to an embodiment of this application. This scenario may include, for example, a user 10, an intelligent terminal 11, and a server 12. Various clients capable of displaying images may be installed in the intelligent terminal 11, for example, a webpage browser, Tencent video, shopping app clients, and the like. The user may operate the client in the intelligent terminal 11, to request the client in the intelligent terminal 11 to display an image. For example, the user may request the Tencent video in the intelligent terminal 11 to play a video. After a communication connection is established between the client in the intelligent terminal 11 and the server 12, an image is obtained from the server 12 according to the request of the user and displayed. The displayed image is used as an image to be processed, and the intelligent terminal 11 or the server 12 performs the following operations:

extracting features of at least one object included in an image to be processed;

determining, for each object, feature similarities between the feature of the object and class nodes in a pre-constructed search tree, the search tree being used for representing a presentation object set, each class node being used for representing one class of objects, each class node including at least one leaf node, and both the class nodes and the leaf nodes in the search tree being used for representing presentation objects;

selecting class nodes according to descending order of the feature similarities with the object, and calculating feature similarities between leaf nodes included in the selected class nodes and the object, until a quantity of leaf nodes for calculation reaches a target quantity; and selecting front N class nodes and leaf nodes as to-be-recommended presentation objects according to descending order of the feature similarities, N being a positive integer less than the target quantity.

Definitely, during specific implementation, some of the foregoing steps may be performed by the intelligent terminal 11, and some may be performed by the server 12. For example, the intelligent terminal may extract features of at least one object included in an image to be processed, and then send the features of the objects to the server 12. Then, the server 12 performs subsequent operations to determine to-be-recommended presentation objects.

The intelligent terminal 11 and the server 12 may be communicatively connected through a communications network. The network may be a local area network, a wide area network, any type of data communications network, or the like. The intelligent terminal 11 may be a mobile phone, a tablet computer, a notebook computer, a personal computer, or the like. The server 12 may be any device that can support the corresponding presentation object determining method based on image content.

For ease of understanding of the presentation object determining method based on image content according to the embodiment of this application, the method is further described below through the following embodiment.

Figure 2:
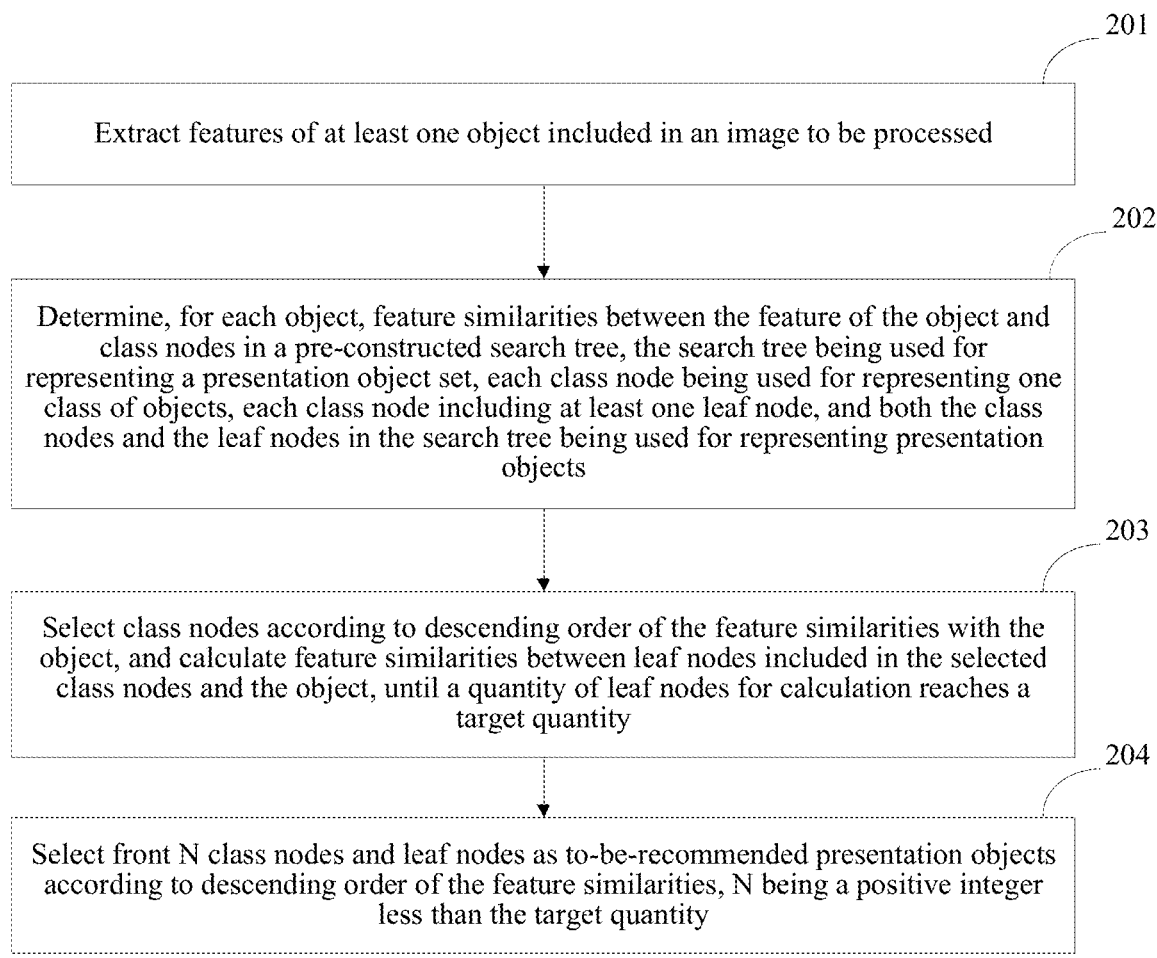
FIG. 2 is a schematic flowchart of a presentation object determining method based on image content according to an embodiment of this application.

Refer to FIG. 2, which is a flowchart of a presentation object determining method based on image content according to an embodiment of this application. The method includes the following steps:

Step 201: Extract features of at least one object included in an image to be processed.

Step 202: Determine, for each object, feature similarities between the feature of the object and class nodes in a pre-constructed search tree. The search tree is used for representing a presentation object set, each class node is used for representing one class of objects, each class node includes at least one leaf node, and both the class nodes and the leaf nodes in the search tree are used for representing presentation objects.

Each class node is used for representing one class of objects. Therefore, in the process of calculating feature similarities, feature similarities between classes corresponding to the class nodes and the object are actually calculated. One class of presentation objects corresponding to one class node may have a corresponding class feature. Therefore, the feature similarities between the classes corresponding to the class nodes and the object may be calculated based on similarities between the class features of the class nodes and the object.

Step 203: Select class nodes according to descending order of the feature similarities with the object, and calculate feature similarities between leaf nodes included in the selected class nodes and the object, until a quantity of leaf nodes for calculation reaches a target quantity.

Each leaf node is used for representing a presentation object. Therefore, in the process of calculating feature similarities, feature similarities between presentation objects corresponding to the leaf nodes and the object are actually calculated. The presentation object corresponding to the leaf node may have a corresponding object feature. Therefore, the feature similarities between the presentation objects corresponding to the leaf nodes and the object may be calculated based on similarities between the object features of the presentation objects and the feature of the object.

For example, according to descending order of the feature similarities with the object in the image, the class nodes are N1, N2, N3, and N4 in order. Then, feature similarities between leaf nodes and the object are calculated starting from leaf nodes of N1. If the quantity of leaf nodes for calculation does not reach the target quantity after the calculation for the leaf nodes of N1, feature similarities between leaf nodes and the object are continued to be calculated starting from leaf nodes of the class node N2, until the quantity of leaf nodes for calculation reaches the target quantity. In this way, the feature of the object is merely compared with presentation objects under a class node with a highest feature similarity first, so that reasonable to-be-recommended presentation objects can be found desirably. Moreover, it is unnecessary to compare the feature of the object with all presentation objects in the search tree, so that retrieval efficiency can be improved. Because it is more likely to find to-be-recommended presentation objects in class nodes with high feature similarities, time spent on retrieval can be further reduced.

Step 204: Select front N class nodes and leaf nodes as to-be-recommended presentation objects according to descending order of the feature similarities, where N is a positive integer less than the target quantity.

It can be seen that, in the embodiment of this application, a search tree is constructed to implement orderly management of presentation objects in a presentation object set, so that retrieval can be optimized during a search for similar objects (that is, to-be-recommended presentation objects) of an object in an image. In addition, in the embodiment of this application, during retrieval of the to-be-recommended presentation objects, instead of traversing the whole presentation object set, retrieval is first performed in classes having high similarities with the object in the image. Therefore, the amount of computing can be reduced, and processing resources can be saved. Further, in the embodiment of this application, retrieval can be stopped once a target quantity is reached, thereby further improving retrieval efficiency.

In one embodiment, presentation objects may also be represented by leaf nodes only. In this case, the class nodes correspond to labels. That is, one class node corresponds to at least one label, and labels are used for representing classes of the presentation objects. For example, if the extracted object is clothes, the label may be clothes; if the extracted object is a face, the label is face. During specific implementation, the search tree may be constructed according to the following method that includes steps A1 and A2:

Step A1: Determine labels corresponding to the presentation objects, where one label represents one class.

During specific implementation, labels corresponding to presentation objects may be marked manually. Definitely, it is also possible to use an artificial intelligence learning method, in which a probability of each presentation object belonging to each label is determined by using a pre-constructed label-based classification model, and a label with a highest probability is selected as the label corresponding to the presentation object, or a label with a probability greater than a preset probability is selected as the label of the presentation object. When a label with a probability greater than the preset probability is selected as the label of the presentation object, one presentation object may correspond to multiple labels.

Step A2: Use each label as a class node, and use each presentation object corresponding to the label as a leaf node of the label.

Through the foregoing search tree construction process, a search three with multiple class nodes as main nodes may be created, where multiple leaf nodes are attached to each class node.

In this case, during specific implementation, step 202 of determining, for each object extracted, feature similarities between the object and class nodes in a pre-constructed search tree based on the feature of the object may specifically include the following operations:

For each object extracted, based on a pre-constructed classification model, probabilities of the object belonging to the labels are determined as the feature similarities between the object and the class nodes. The classification model may be trained according to pre-labeled training samples.

In addition, during specific implementation, a meaning closest to the feature of the object may be determined according to the extracted feature of the object and a transformation relationship between features and preset semantic spaces, and then a label corresponding to the object is determined according to the meaning. For example, if a meaning closest to the extracted feature of the object is clothes, it is determined that a label to which the object belongs is clothes. A distance between the feature of the object and the closest meaning is used as a feature similarity between the feature of the object and the corresponding label. It should be noted that, a method for mapping the extracted feature of the object to a preset semantic space may be determined according to an existing technology, and is not limited in this application.

Further, in the embodiment of this application, to facilitate presentation object management and retrieval, if both the class nodes and the leaf nodes are used for representing presentation objects, the search tree may be constructed according to the following method including steps B1 to B3:

Step B1: Classify presentation objects in the presentation object set based on a cluster analysis method, where presentation objects between which a feature similarity is greater than a target similarity are classified into one class.

Figure 3:
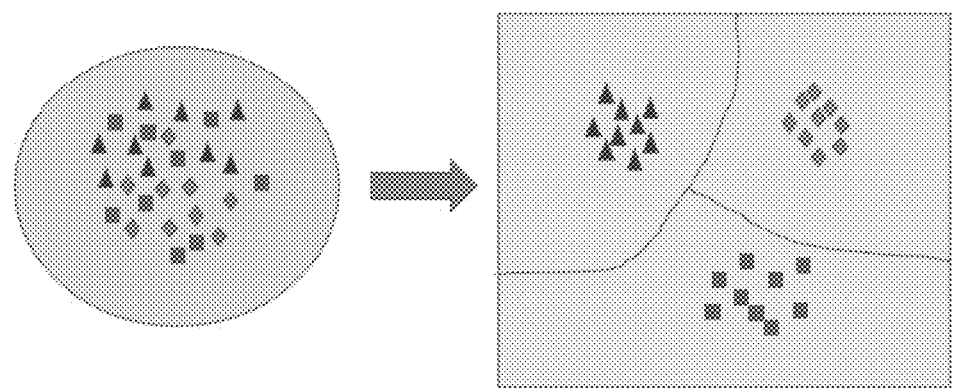
FIG. 3 is a schematic diagram of classification of presentation objects according to an embodiment of this application.

As shown in FIG. 3, scattered presentation objects are shown in the oval area on the left side, and after cluster analysis, the presentation objects are clustered. A clustering result is shown in the figure on the right side of FIG. 3. The presentation objects are classified into multiple classes.

The cluster analysis method may be any method, for example, a direct clustering method, a minimum distance clustering method, and a maximum distance clustering method.

Step B2: Determine, for each class of presentation objects, a presentation object that is in the class of presentation objects and that has a shortest distance to a cluster center as a class node for representing the class of presentation objects.

Step B3: Use each presentation object in the class of presentation objects except for the class node as a leaf node of the class node.

In this way, in the embodiment of this application, each class node represents one actual presentation object, and each leaf node represents one actual presentation object. Therefore, during calculation of feature similarities with the object, calculation for a class node is relative to calculation for an actual presentation object, and each time a feature similarity is calculated, a comparison is made with a presentation object in the presentation object set. Therefore, calculation of each feature similarity is meaningful.

Further, in the embodiment of this application, to further ensure that calculation of each feature similarity is a comparison with an actual presentation object, the search tree in the embodiment of this application may include a root node, and the root node is also an actual presentation object. Specifically, the method further includes the following steps:

Step C1: Calculate a cluster center of the class nodes according to features of the class nodes.

Step C2: Select, from the class nodes, a class node with a shortest distance to the cluster center of the class nodes as a root node in the search tree, use other class nodes except the root node as child nodes of the root node, and use the child nodes as the class nodes in the search tree, where the root node, the class nodes, and the leaf nodes all represent presentation objects.

In this way, the root node is also an actual presentation object. During specific implementation, after the feature of the object included in the image to be processed is extracted, the method further includes: calculating a feature similarity between the object and the root node.

It can be seen that, the root node participates in calculation of the feature similarity, and the root node is also taken into consideration in final selection of the to-be-recommended presentation objects.

Figure 4:
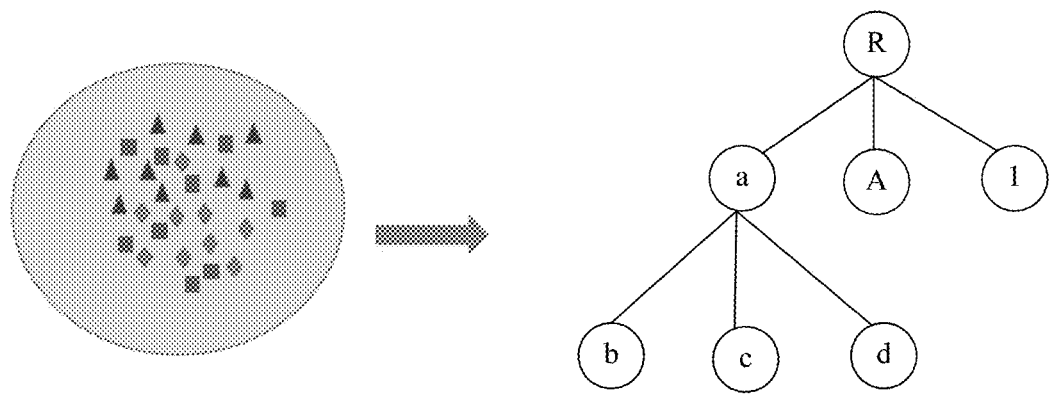
FIG. 4 is a schematic structural diagram of a search tree according to an embodiment of this application.

FIG. 4 is a schematic structural diagram of an established search tree. The oval area on the left side of FIG. 4 represents a presentation object set, and the set includes presentation objects. The structure of the search tree is shown in FIG. 4. Nodes R, a, A, 1, b, c, and d are all presentation objects; a, b, c, and d are in the same class, and a is closest to a cluster center of the class. Therefore, a is used to represent a class node; b, c, and d are leaf nodes of a. R, a, A, and 1 are in the same class, and R is closest to a cluster center of the class. Therefore, R is used as a root node; a, A, and 1 are class nodes.

Further, during specific implementation, to improve retrieval efficiency by using the number of iterations as a retrieval termination condition, step 203 in the embodiment of this application (that is, selecting class nodes according to descending order of the feature similarities with the object, and calculating feature similarities between leaf nodes included in the selected class nodes and the object, until a quantity of leaf nodes for calculation reaches a target quantity) may specifically include the following steps:

Step D1: Use the class nodes as a class set.

Step D2: Select, from the class set, a class node having a highest feature similarity with the object.

Step D3: Select a leaf node from the selected class node, calculate a feature similarity between the leaf node and the object, and increase the number of leaf node selection times by a target value.

During specific implementation, the target value may be 1, that is, each time a feature similarity is calculated, the number of leaf node selection times is increased by 1.

The leaf node may be selected randomly. Further, to ensure that a presentation object with a feature similarity as high as possible can be retrieved, in the embodiment of this application, a leaf node having a highest feature similarity with the class node is selected from specified leaf nodes in the selected class node, where the specified leaf nodes are leaf nodes of which feature similarities with the object are not calculated. In this way, during retrieval of leaf nodes under a class node, a leaf node having a high feature similarity with the class node definitely has a high feature similarity with the object. Therefore, a presentation object with a feature similarity as high as possible can be retrieved first.

Step D4: Determine whether the quantity of selected leaf nodes reach a target quantity.

Step D5: Perform step 204 if the quantity of selected leaf nodes reaches the target quantity.

Step D6: Determine whether there is any leaf node, of which a feature similarity with the object is not calculated yet, in the selected class node if the quantity of selected leaf nodes does not reach the target quantity.

Step D7: Return to perform step D3 if there is any leaf node of which a feature similarity with the object is not calculated yet.

Step D8: Delete the selected class node from the class set, and return to perform step D2 if there is no leaf node of which a feature similarity with the object is not calculated yet.

In this way, the class node selected each time is a class node with a high feature similarity, and the leaf node selected each time is also a leaf node most likely to have a high feature similarity with the object. Therefore, in limited comparisons, presentation objects with feature similarities as high as possible can be selected. Therefore, selected to-be-recommended presentation objects are more reasonable.

During specific implementation, levels of feature similarities may also be divided. For example, a level of each class node is determined according to a correspondence between levels and feature similarity ranges, where the feature similarities may be directly proportional to the levels, that is, a higher level indicates a higher feature similarity. In this case, during specific implementation, feature similarities between class nodes and the object may be calculated first starting from a class node with a feature similarity belonging to a high level.

Definitely, during specific implementation, it is also possible to first select class nodes having feature similarities greater than a target similarity, and then calculate feature similarities between leaf nodes included in the class nodes and the object according to descending order of the feature similarities of the selected class nodes.

In the following, for ease of further understanding of the presentation object determining method based on image content provided in the embodiment of this application, the method is further described below through the following process by using retrieval of similar faces as an example.

Figure 5:
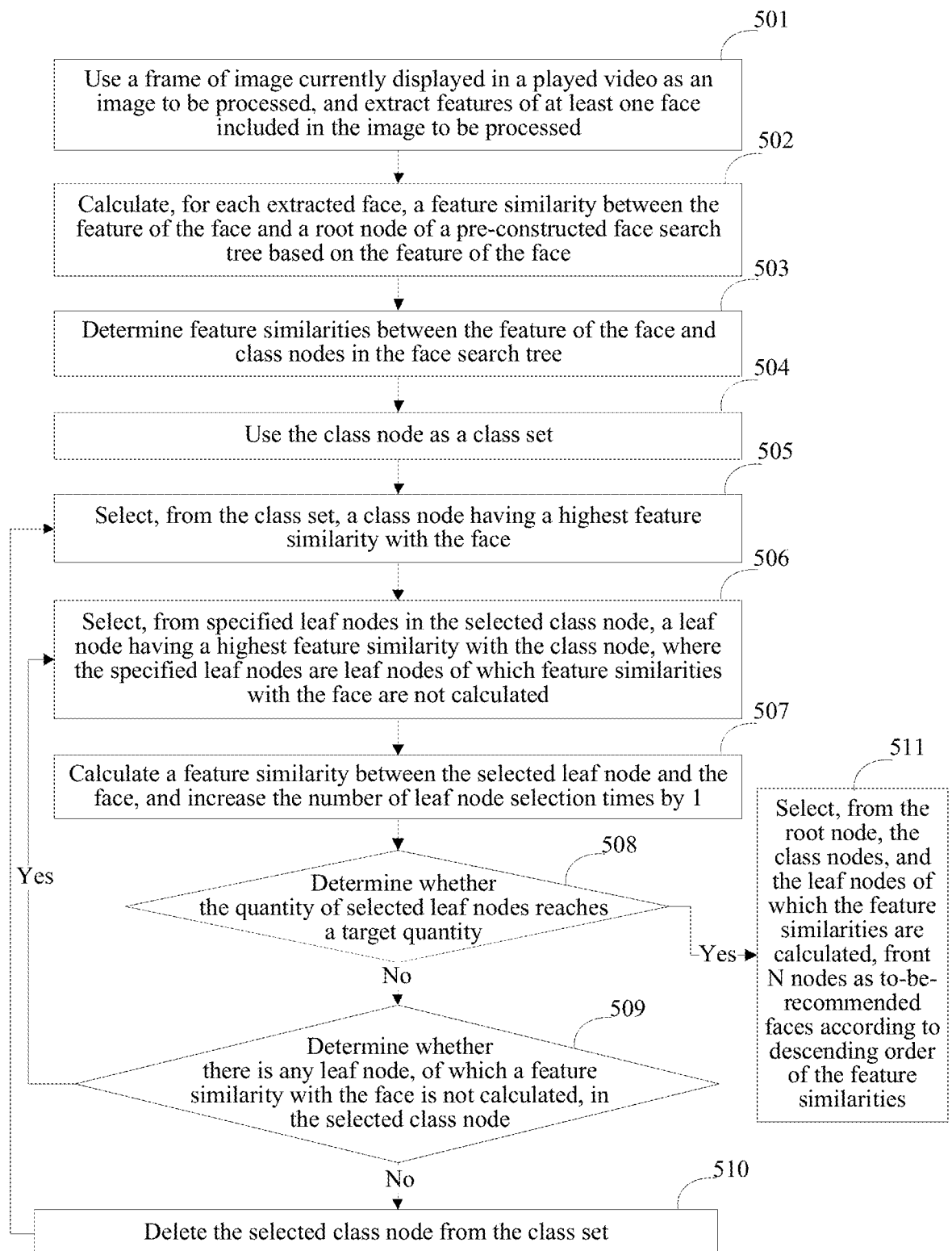
FIG. 5 is a schematic flowchart of a presentation object determining method based on image content according to an embodiment of this application.

As shown in FIG. 5, the method provided in the embodiment of this application is further described by using retrieval of faces similar to a face in a video as an example, and the method includes the following steps:

Step 501: Use a frame of image currently displayed in a played video as an image to be processed, and extract features of at least one face included in the image to be processed.

Definitely, during specific implementation, an image in a specified frame after the frame of image currently displayed may also be used as an image to be processed, to remedy the problem that due to a long retrieval time, similar faces are displayed after the frame of image currently displayed is played. During specific implementation, the image to be processed may be determined according to an actual requirement, and is not limited in this application.

Step 502: Calculate, for each extracted face, a feature similarity between the feature of the face and a root node of a pre-constructed face search tree based on the feature of the face.

A method for constructing the face search tree is similar to the foregoing construction methods based on step B1 to step B3 and step C1 and step C2, which are not described in detail herein again. It should be noted that, the root node in the face search tree is also a face in a presentation object set.

Step 503: Determine feature similarities between the feature of the face and class nodes in the face search tree.

Step 504: Use the class node as a class set.

Step 505: Select, from the class set, a class node having a highest feature similarity with the face.

Step 506: Select, from specified leaf nodes in the selected class node, a leaf node having a highest feature similarity with the class node, where the specified leaf nodes are leaf nodes of which feature similarities with the face are not calculated.

Step 507: Calculate a feature similarity between the selected leaf node and the face, and increase the number of leaf node selection times by 1.

Step 508: Determine whether the quantity of selected leaf nodes reaches a target quantity, if no, perform step 509, and if yes, perform step 511.

Step 509: Determine whether there is any leaf node, of which a feature similarity with the face is not calculated, in the selected class node, if yes, perform step 506, and if no, perform step 510.

Step 510: Delete the selected class node from the class set, and return to perform step 505.

Step 511: Select, from the root node, the class nodes, and the leaf nodes of which the feature similarities are calculated, front N nodes as to-be-recommended faces according to descending order of the feature similarities.

If the feature similarities of the root node and a class node with the face are ranked in the front N positions, the selected N nodes include the root node and the class node.

In the embodiment of this application, based on a video, faces similar to a face in the video are selected and recommended to a user. Subsequently, the user may select a similar face that the user is interested in, to learn about a resume of the actor/actress.

Definitely, during specific implementation, the extracted object may also be a commodity. In this way, similar commodities may be recommended to the user through the video. A shopping requirement of the user may be satisfied through the recommended commodities when required, and the user does not need to search for the commodity in the video.

In addition, during specific implementation, the search tree may include one main class of presentation objects, for example, the presentation objects are all clothes. Alternatively, the search tree may include multiple main classes of presentation objects, for example, clothes and shoes. During specific implementation, the search tree may be constructed according to an actual requirement by using the method provided in the embodiment of this application. For example, multiple search trees may be constructed, where one search tree represents clothes, and another search tree represents shoes. During specific implementation, a search tree for use in subsequent retrieval may be determined according to root nodes of the search trees. For example, clothes have a low similarity with the root node of the search tree of shoes, and have a high similarity with the root node of the search tree of clothes. Therefore, during determining of to-be-recommended presentation objects subsequently, the to-be-recommended presentation objects are first retrieved in the search tree of clothes based on a depth-first search method.

Based on the same invention conception, an embodiment of this application further provides a presentation object determining apparatus based on image content. The principle and beneficial effect of the apparatus are similar to the content in the foregoing method embodiment, and are not described in detail herein again.

Figure 6:
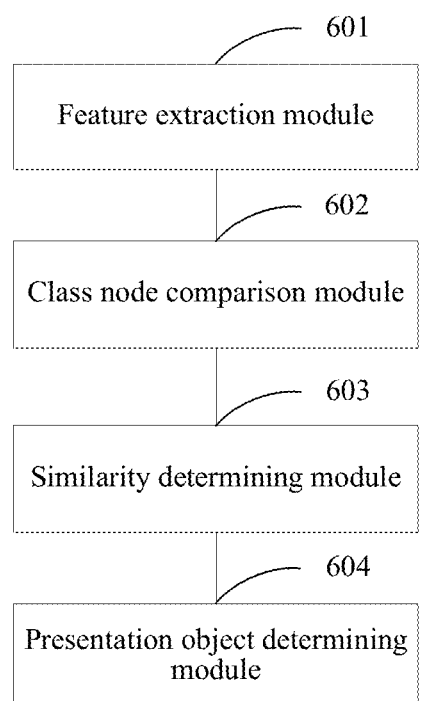
FIG. 6 is a schematic structural diagram of a presentation object determining apparatus based on image content according to an embodiment of this application.

FIG. 6 is a schematic structural diagram of the apparatus, including a feature extraction module 601, a class node comparison module 602, a similarity determining module 603, and a presentation object determining module 604.

The feature extraction module 601 extracts features of at least one object included in an image to be processed.

The class node comparison module 602 determines, for each object, feature similarities between the feature of the object and class nodes in a pre-constructed search tree. The search tree is used for representing a presentation object set, each class node is used for representing one class of objects, each class node includes at least one leaf node, and both the class nodes and the leaf nodes in the search tree are used for representing presentation objects.

The similarity determining module 603 selects class nodes according to descending order of the feature similarities with the object, and calculates feature similarities between leaf nodes included in the selected class nodes and the object, until a quantity of leaf nodes for calculation reaches a target quantity.

The presentation object determining module 604 selects front N class nodes and leaf nodes as to-be-recommended presentation objects according to descending order of the feature similarities, where N is a positive integer less than the target quantity.

Moreover, the apparatus further includes a search tree construction module. The search tree construction module constructs the search tree according to the following method if both the class nodes and the leaf nodes are used for representing presentation objects:

classifying presentation objects in the presentation object set based on a cluster analysis method, where presentation objects between which a feature similarity is greater than a target similarity are classified into one class;

determining, for each class of presentation objects, a presentation object that is in the class of presentation objects and that has a shortest distance to a cluster center as a class node for representing the class of presentation objects; and using each presentation object in the class of presentation objects except for the class node as a leaf node of the class node.

Further, the similarity determining module 603 specifically includes a class set determining unit, a class node selection unit, a leaf node selection unit, an iteration judgment unit, a first triggering unit, a leaf node judgment unit, a second triggering unit, and a third triggering unit.

The class set determining unit uses the class nodes as a class set.

The class node selection unit selects a class node having a highest feature similarity with the object from the class set.

The leaf node selection unit selects a leaf node from the selected class node, calculates a feature similarity between the leaf node and the object, and increases the number of leaf node selection times by a target value.

The iteration judgment unit determines whether the number of leaf node selection times reaches a target quantity.

The first triggering unit triggers the presentation object determining module to select front N class nodes and leaf nodes as to-be-recommended presentation objects according to descending order of the feature similarities, if a determining result of the iteration judgment unit is that the number of leaf node selection times reaches the target quantity.

The leaf node judgment unit determines whether there is any leaf node, of which a feature similarity with the object is not calculated yet, in the selected class node if a determining result of the iteration judgment unit is that the number of leaf node selection times does not reach the target quantity.

The second triggering unit triggers the leaf node selection unit to select a leaf node from the selected class node, calculates a feature similarity between the leaf node and the object, and increases the number of leaf node selection times by a target value, if a determining result of the leaf node judgment unit is that there is any leaf node of which a feature similarity with the object is not calculated yet.

The third triggering unit deletes the selected class node from the class set and trigger the class node selection unit to select a class node having a highest feature similarity with the object from the class set, if a determining result of the leaf node judgment unit is that there is no leaf node of which a feature similarity with the object is not calculated yet.

Further, the leaf node selection unit selects a leaf node having a highest feature similarity with the class node from specified leaf nodes of the class node, the specified leaf nodes being leaf nodes of which feature similarities with the object are not calculated.

Moreover, the apparatus further includes a class center determining module, a root node determining module, and a root node similarity determining module.

The class center determining module calculates a cluster center of the class nodes according to features of the class nodes.

The root node determining module selects, from the class nodes, a class node with a shortest distance to the cluster center of the class nodes as a root node in the search tree, uses other class nodes except the root node as child nodes of the root node, and uses the child nodes as the class nodes in the search tree, where the root node, the class nodes, and the leaf nodes all represent presentation objects.

The root node similarity determining module calculates a feature similarity between the object and the root node after the feature extraction module extracts the feature of the object included in the image to be processed.

Figure 7:
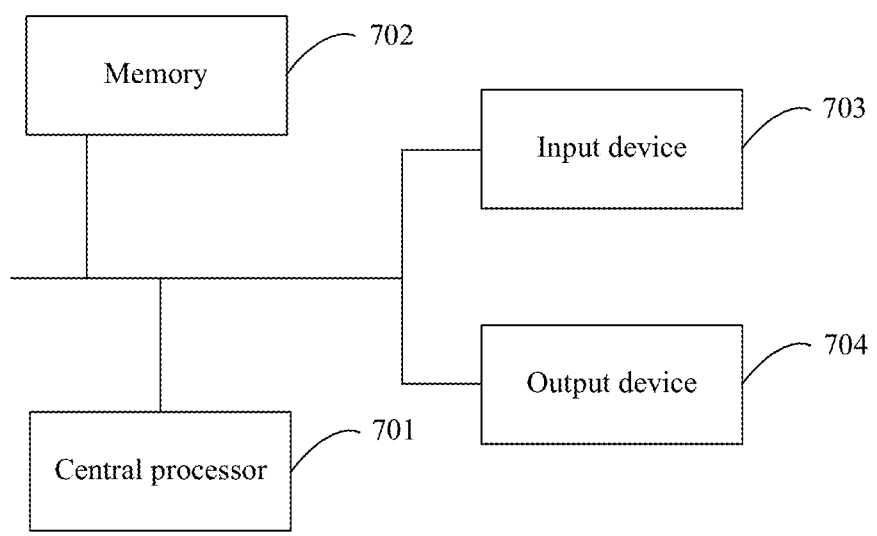
FIG. 7 is a schematic structural diagram of a computing device according to an embodiment of this application.

An embodiment of this application further provides a computing device. The computing device specifically may be a smartphone, a tablet computer, a personal digital assistant (PDA), or the like. As shown in FIG. 7, the computing device may include a central processing unit (CPU) 701 (e.g., processing circuitry), a memory 702, an input device 703, an output device 704, and the like. The input device may include a keyboard, a mouse, a touch screen, and the like. An input device may include a display device, such as a liquid crystal display (LCD), or a cathode ray tube (CRT).

The memory may include a read-only memory (ROM) and a random access memory (RAM), and provides a processor with program instructions and data stored in the memory. In the embodiment of this application, the memory may store program instructions of a presentation object determining method based on image content. The processor invokes the program instructions stored in the memory, and performs the following operations according to the obtained program instructions:

extracting features of at least one object included in an image to be processed;

determining, for each object, feature similarities between the feature of the object and class nodes in a pre-constructed search tree, where the search tree is used for representing a presentation object set, each class node is used for representing one class of objects, each class node includes at least one leaf node, and both the class nodes and the leaf nodes in the search tree are used for representing presentation objects;

selecting class nodes according to descending order of the feature similarities with the object, and calculating feature similarities between leaf nodes included in the selected class nodes and the object, until a quantity of leaf nodes for calculation reaches a target quantity; and selecting front N class nodes and leaf nodes as to-be-recommended presentation objects according to descending order of the feature similarities, where N is a positive integer less than the target quantity.

In some embodiments, the processor further invokes the program instructions stored in the memory and performs the following presentation object determining method based on image content according to the obtained program instructions:

constructing the search tree according to the following method:

classifying presentation objects in the presentation object set based on a cluster analysis method, where presentation objects between which a feature similarity is greater than a target similarity are classified into one class;

determining, for each class of presentation objects, a presentation object that is in the class of presentation objects and that has a shortest distance to a cluster center as a class node for representing the class of presentation objects; and using each presentation object in the class of presentation objects except for the class node as a leaf node of the class node.

In some embodiments, the processor further invokes the program instructions stored in the memory and performs the following presentation object determining method based on image content according to the obtained program instructions:

using the class nodes as a class set;

selecting a class node having a highest feature similarity with the object from the class set;

selecting a leaf node from the selected class node, calculating a feature similarity between the leaf node and the object, and increasing the number of leaf node selection times by a target value;

determining whether the number of leaf node selection times reaches a target quantity;

performing an operation of selecting, from nodes which are used for representing presentation objects and of which feature similarities have been calculated, a preset quantity of front nodes in descending order of the feature similarities as the to-be-recommended presentation objects, if the number of leaf node selection times reaches the target quantity;

determining whether there is any leaf node, of which a feature similarity with the object is not calculated yet, in the selected class node if the number of leaf node selection times does not reach the target quantity;

returning to perform the operation of selecting a leaf node from the selected class node, calculating a feature similarity between the leaf node and the object, and increasing the number of leaf node selection times by a target value, if there is any leaf node of which a feature similarity with the object is not calculated yet; and deleting the selected class node from the class set, and returning to perform the operation of selecting a class node having a highest feature similarity with the object from the class set, if there is no leaf node of which a feature similarity with the object is not calculated yet.

In some embodiments, the processor further invokes the program instructions stored in the memory and performs the following presentation object determining method based on image content according to the obtained program instructions:

selecting a leaf node having a highest feature similarity with the class node from specified leaf nodes of the class node, the specified leaf nodes being leaf nodes of which feature similarities with the object are not calculated.

In some embodiments, the processor further invokes the program instructions stored in the memory and performs the following presentation object determining method based on image content according to the obtained program instructions:

calculating a cluster center of the class nodes according to features of the class nodes;

selecting, from the class nodes, a class node with a shortest distance to the cluster center of the class nodes as a root node in the search tree, using other class nodes except the root node as child nodes of the root node, and using the child nodes as the class nodes in the search tree, where the root node, the class nodes, and the leaf nodes all represent presentation objects; and calculating a feature similarity between the object and the root node after the feature of the objected included in the image to be processed is extracted.

An embodiment of this application further provides a computer readable storage medium (e.g., non-transitory computer-readable medium) configured to store computer executable instructions, including a program for performing the foregoing presentation object determining method based on image content.

The computer readable storage medium may be any available medium or data storage device accessible to a computer, and includes, but is not limited to, a magnetic memory (such as a floppy disk, a hard disk, a magnetic tape, or a magneto-optical disk (MO)), and optical memory (such as a CD, a DVD, a BD, or an HVD), a semiconductor memory (such as a ROM, an EPROM, an EEPROM, a non-volatile memory (NAND FLASH), or a solid-state disk (SSD)), and the like.

Finally, it should be noted that, the foregoing embodiments are merely used for illustrating, rather than limiting, the technical solutions in this application. Although this application is described in detail with reference to the foregoing embodiments, a person of ordinary skill in the art should understand that, modifications can be made on the technical solutions described in the foregoing embodiments, or equivalent replacements may be made on some of the technical solutions. These modifications or equivalent replacements do not cause the essence of the corresponding technical solutions to depart from the spirit and scope of the technical solutions of the embodiments of this application.

What is claimed is:

1. A presentation object determining method, comprising:
   extracting a feature of an object in an image;
   determining according to the feature of the object, a plurality of first feature similarities between the object and a plurality of class nodes in a pre-constructed search tree, each of the plurality of class nodes being associated with at least one leaf node, each of the plurality of class nodes and each of the at least one leaf node associated with the respective class node being associated with a respective one of a plurality of presentation objects, each of the plurality of class nodes representing a class of presentation objects, the respective one of the plurality of presentation objects associated with each of the plurality of class nodes having a shortest distance to a cluster center of the respective class of presentation objects;
   selecting a subset of the plurality of class nodes according to the plurality of first feature similarities;
   calculating a plurality of second feature similarities between the plurality of leaf nodes associated with the selected subset of the plurality of class nodes and the object; and
   selecting, by processing circuitry and from the plurality of presentation objects, a predetermined quantity of the plurality of presentation objects of the plurality of class nodes and the plurality of leaf nodes according to the plurality of first feature similarities and the plurality of second feature similarities.

2. The method according to claim 1, wherein the pre-constructed search tree represents a presentation object set including the plurality of presentation objects.

3. The method according to claim 2, further comprising:
   classifying, by the processing circuitry, the plurality of presentation objects in the presentation object set based on a cluster analysis method;
   determining, by the processing circuitry and for each class of presentation objects, a presentation object that is in the respective class of presentation objects and that has the shortest distance to the cluster center of the respective one of the plurality of class nodes as the class node for representing the respective class of presentation objects; and
   determining, by the processing circuitry and for each class of presentation objects, each presentation object in the respective class of presentation objects except for the presentation object associated with the class node of the respective class of presentation objects as one of the at least one leaf node associated with the class node of the respective class of presentation objects.

4. The method according to claim 3, further comprising:
   calculating, by the processing circuitry, the cluster center of the plurality of class nodes according to features of the plurality of class nodes;
   selecting, by the processing circuitry and from the plurality of class nodes, a class node with a shortest distance to the cluster center of the plurality of class nodes as a root node in the pre-constructed search tree;
   associating, by the processing circuitry, other class nodes of the plurality of class nodes except the root node with the root node; and
   calculating, by the processing circuitry, a fourth feature similarity between the object and the root node.

5. The method according to claim 1, wherein a number of the plurality of calculated second feature similarities is limited to a target quantity.

6. The method according to claim 1, wherein all of the second feature similarities between the plurality of leaf nodes associated with one of the subset of the plurality of class nodes and the object are calculated before the plurality of second feature similarities between the plurality of leaf nodes associated with another one of the subset of the plurality of class nodes and the object is calculated.

7. The method according to claim 1, wherein a calculation order of the plurality of second feature similarities is based on a plurality of third feature similarities between one of the subset of the plurality of class nodes and the plurality of leaf nodes associated with the one of the subset of the plurality of class nodes.

8. An apparatus, comprising:
   processing circuitry configured to:
   extract a feature of an object in an image;
   determine, according to the feature of the object, a plurality of first feature similarities between the object and a plurality of class nodes in a pre-constructed search tree, each of the plurality of class nodes being associated with at least one leaf node, each of the plurality of class nodes and each of the at least one leaf node associated with the respective class node being associated with a respective one of a plurality of presentation objects, each of the plurality of class nodes representing a class of presentation objects, the respective one of the plurality of presentation objects associated with each of the plurality of class nodes having a shortest distance to a cluster center of the respective class of presentation objects;
   select a subset of the plurality of class nodes according to the plurality of first feature similarities;

calculate a plurality of second feature similarities between the plurality of leaf nodes associated with the selected subset of the plurality of class nodes and the object; and select, from the plurality of presentation objects, a predetermined quantity of the plurality of presentation objects of the plurality of class nodes and the plurality of leaf nodes according to the plurality of first feature similarities and the plurality of second feature similarities.

9. The apparatus according to claim 8, wherein the pre-constructed search tree represents a presentation object set including the plurality of presentation objects.

10. The apparatus according to claim 9, wherein the processing circuitry is further configured to:

classify the plurality of presentation objects in the presentation object set based on a cluster analysis method;

determine, for each class of presentation objects, a presentation object that is in the respective class of presentation objects and that has the shortest distance to the cluster center of the respective one of the plurality of class nodes as the class node for representing the respective class of presentation objects; and determine, for each class of presentation objects, each presentation object in the respective class of presentation objects except for the presentation object associated with the class node of the respective class of presentation objects as one of the at least one leaf node associated with the class node of the respective class of presentation objects.

11. The apparatus according to claim 10, wherein the processing circuitry is further configured to:

calculate the cluster center of the plurality of class nodes according to features of the plurality of class nodes;

select, from the plurality of class nodes, a class node with a shortest distance to the cluster center of the plurality of class nodes as a root node in the pre-constructed search tree;

associate other class nodes of the plurality of class nodes except the root node with the root node; and calculate a fourth feature similarity between the object and the root node.

12. The apparatus according to claim 8, wherein a number of the plurality of calculated second feature similarities is limited to a target quantity.

13. The apparatus according to claim 8, wherein all of the second feature similarities between the plurality of leaf nodes associated with one of the subset of the plurality of class nodes and the object are calculated before the plurality of second feature similarities between the plurality of leaf nodes associated with another one of the subset of the plurality of class nodes and the object is calculated.

14. The apparatus according to claim 8, wherein a calculation order of the plurality of second feature similarities is based on a plurality of third feature similarities between one of the subset of the plurality of class nodes and the plurality of leaf nodes associated with the one of the subset of the plurality of class nodes.

15. A non-transitory computer-readable storage medium storing a program executable by at least one processor to perform:

extracting a feature of an object in an image;

determining, according to the feature of the object, a plurality of first feature similarities between the object and a plurality of class nodes in a pre-constructed search tree, each of the plurality of class nodes being associated with at least one leaf node, each of the plurality of class nodes and each of the at least one leaf node associated with the respective class node being associated with a respective one of a plurality of presentation objects, each of the plurality of class nodes representing a class of presentation objects, the respective one of the plurality of presentation objects associated with each of the plurality of class nodes having a shortest distance to a cluster center of the respective class of presentation objects;

selecting a subset of the plurality of class nodes according to the plurality of first feature similarities;

calculating a plurality of second feature similarities between the plurality of leaf nodes associated with the selected subset of the plurality of class nodes and the object; and selecting, from the plurality of presentation objects, a predetermined quantity of the plurality of presentation objects of the plurality of class nodes and the plurality of leaf nodes according to the plurality of first feature similarities and the plurality of second feature similarities.

16. The non-transitory computer-readable storage medium according to claim 15, wherein the pre-constructed search tree represents a presentation object set including the plurality of presentation objects.

17. The non-transitory computer-readable storage medium according to claim 16, wherein the program is executable by the at least one processor to perform:

classifying the plurality of presentation objects in the presentation object set based on a cluster analysis method;

determining, for each class of presentation objects, a presentation object that is in the respective class of presentation objects and that has the shortest distance to the cluster center of the respective one of the plurality of class nodes as the class node for representing the respective class of presentation objects; and determining, for each class of presentation objects, each presentation object in the respective class of presentation objects except for the presentation object associated with the class node of the respective class of presentation objects as one of the at least one leaf node associated with the class node of the respective class of presentation objects.

18. The non-transitory computer-readable storage medium according to claim 15, wherein a number of the plurality of calculated second feature similarities is limited to a target quantity.

19. The non-transitory computer-readable storage medium according to claim 15, wherein all of the second feature similarities between the plurality of leaf nodes associated with one of the subset of the plurality of class nodes and the object are calculated before the plurality of second feature similarities between the plurality of leaf nodes associated with another one of the subset of the plurality of class nodes and the object is calculated.

20. The non-transitory computer-readable storage medium according to claim 15, wherein a calculation order of the plurality of second feature similarities is based on a plurality of third feature similarities between one of the subset of the plurality of class nodes and the plurality of leaf nodes associated with the one of the subset of the plurality of class nodes.

* * * * *